United States Patent
Grobe (10) Patent No.: US 8,396,361 B2
(45) Date of Patent: Mar. 12, 2013

(54) METHOD FOR THE PROTECTION OF A PASSIVE OPTICAL TRANSMISSION NETWORK AS WELL AS A PASSIVE OPTICAL TRANSMISSION NETWORK WITH A CORRESPONDING PROTECTION MECHANISM

(75) Inventor: Klaus Grobe, Türkenfeld (DE)

(73) Assignee: ADVA Optical Networking SE, Meiningen (DE)

( * ) Notice: Subject to any disclaimer, the term of this patent is extended or adjusted under 35 U.S.C. 154(b) by 451 days.

(21) Appl. No.: 12/665,807

(22) PCT Filed: Jan. 20, 2009

(86) PCT No.: PCT/DE2009/000064
§ 371 (c)(1),
(2), (4) Date: Dec. 21, 2009

(87) PCT Pub. No.: WO2009/092356
PCT Pub. Date: Jul. 30, 2009

(65) Prior Publication Data
US 2010/0189442 A1    Jul. 29, 2010

(30) Foreign Application Priority Data

Jan. 24, 2008  (DE) .......................... 10 2008 005 942

(51) Int. Cl.
*H04B 10/08* (2006.01)
(52) U.S. Cl. ...................... 398/19; 398/12; 398/3; 398/5
(58) Field of Classification Search .................. 398/59, 398/3, 4, 5, 12, 19, 70, 71, 72, 17
See application file for complete search history.

(56) References Cited

U.S. PATENT DOCUMENTS

| | | | |
|---|---|---|---|
| 2005/0129403 A1* | 6/2005 | Koopferstock | 398/83 |
| 2005/0163147 A1* | 7/2005 | Buabbud et al. | 370/436 |
| 2007/0264009 A1 | 11/2007 | Sabat, Jr. et al. | |
| 2009/0074403 A1* | 3/2009 | Chi et al. | 398/3 |

FOREIGN PATENT DOCUMENTS

WO     WO 2006/115536 A2    11/2006

OTHER PUBLICATIONS

Bo Zhang et al., "A Survivable WDM Passive Optical Network with Colorless Optical Network Units", 2006, OECC Proceedings (2 pages).
Queller, A, "Achieving Fiber Protection of the Access Link from the Core to the User", Proc of SPIE, Bd. 5970, No. 5970028, 2005, XP040210824, Bellingham, WA, 98227-0010, USA.

(Continued)

*Primary Examiner* — M. R. Sedighian
(74) *Attorney, Agent, or Firm* — The Culbertson Group, P.C.

(57) ABSTRACT

A method for protecting a passive optical transmission network comprising an optical line terminal (OLT) at least one remote node (RN), and a plurality of network termination nodes (ONU) A bidirectional optical signal transmission can be established between each ONU and the OLT via a first bidirectional optical transmission route by means of which an optical wavelength-multiplexed signal is transmitted in the downstream direction from the OLT to the one or more RNs and in the upstream direction from the one or more RNs to the OLT. A second bidirectional optical transmission route is provided between the OLT and the RNs where the wavelength-multiplexed signal is fed in the upstream direction both to the first and second optical transmission routes. On the detection of a fault state on the first or second optical transmission route, the OLT is switched to the other corresponding optical transmission route.

12 Claims, 4 Drawing Sheets

OTHER PUBLICATIONS

Chan C-K et al., A Novel Centrally Controlled Protection Scheme for Traffic Restoration in WDM Passive Optical Networks, Bd. 17, No. 3, Mar. 1, 2005, Seiten 717-719, XP011127033, ISSN: 1041-1135, IEEE Photonics Technology Letters, Piscataway, NJ, USA.

Langer K-D et al., "Promising evolution paths for passive optical access networks", Transparent Optical Networks, Proceedings of 2004 6th International Conference on Warsaw, Poland, Bd. 1, No. 4, Jul. 4, 2004, Seiten 202-207, XP010743477, Piscataway, NJ, USA.

* cited by examiner

METHOD FOR THE PROTECTION OF A PASSIVE OPTICAL TRANSMISSION NETWORK AS WELL AS A PASSIVE OPTICAL TRANSMISSION NETWORK WITH A CORRESPONDING PROTECTION MECHANISM

The invention relates to a method for the protection of a passive optical transmission network with the features of each of the preambles of Claims 1 and 8, respectively, wherein these methods differ, in principle, in that, in one case, a remote node is directly connected to an optical line terminal by means of an optical transmission route and, in the other case, by means of a ring-shaped transmission route in which an arbitrary number of remote nodes can be connected. In addition, the invention relates to a passive optical transmission network with a corresponding protection mechanism with the features of the preambles of Claims 13 and 18, wherein these variants of optical transmission networks also differ in that, in one case, there is a direct or star-shaped linking of one or more remote nodes to an optical line terminal and, in the other case, a linking by means of a ring-shaped optical transmission network.

The problem of providing a protection mechanism presents itself especially in the case of transmission routes with large transmission capacity or high data traffic, that is, especially in the case of remote transmission routes, because it is here that typically the highest possible concentration of data signals is desired and given. The signals are transmitted here using time-multiplexing or wavelength-multiplexing methods.

In the case of optical transmission routes, there is, in principle, the possibility of protecting, first, the actual optical transmission route, that is, the optical waveguide, and/or, secondly, the individual wavelength channels when transmitting using wavelength multiplexing. In the first case, the transmission path is redundant (line protection) and, in the latter case, the entirety or parts of the transmission equipment are redundant (equipment protection). Obviously, both variants could also be combined.

If line protection is realized, then for a ring-shaped connection of several network nodes, in the case of an interruption of the optical transmission route (for example, in the case of the destruction of the relevant optical waveguide), the data transmission is performed via the other branch of the ring structure, i.e., in the opposite transmission direction. For this purpose, it is typical to convert the relevant signal of one channel to a wavelength that is not occupied in the relevant other ring branch. For this purpose, typically, a complete equivalent wavelength band is provided with a corresponding number of equivalent channels (with corresponding center wavelengths). However, this requires a corresponding circuitry-specific, and thus pecuniary, cost.

In recent years, passive optical transmission networks have also been developed for use as access networks, in particular, local area networks, in which the transmission is performed at least partially also using the wavelength multiplexed method. These networks are used for the direct optical linking of a plurality of subscribers, so-called optical network units (ONU) to one optical line terminal (OLT). The linking of the plurality of ONUs is performed here by a connection of the individual ONUs to at least one remote node (RN), wherein the data transmission between an ONU and the RN is typically performed by means of a single optical waveguide that features bidirectional operation. Usually, between one ONU and one RN there is also only one wavelength channel (bidirectional), wherein, obviously, the use of several wavelength channels would also be possible. Of course, instead of a single optical waveguide that features bidirectional operation for the linking of an ONU to an RN, an optical transmission route consisting of two optical waveguides, each featuring unidirectional operation, could be used. In both cases, wavelength channels with identical or different center wavelengths could be used for the two transmission directions.

In the RN, the signals of the individual wavelength channels of the linked ONUs are assembled into one wavelength-multiplexed signal, wherein this wavelength-multiplexed signal is transmitted to the OLT via one optical transmission route. In the OLT, the received wavelength-multiplexed signal is demultiplexed. The signals of each of the demultiplexed wavelength channels are fed to a corresponding receiver unit. In the same way, in the OLT, a wavelength-multiplexed signal to be transmitted to the relevant RN is generated by the multiplexing of signals of the wavelength channels of a corresponding number of transmitter units. After the transmission of this wavelength-multiplexed signal to the relevant RN, this wavelength-multiplexed signal is demultiplexed in the RN. The signals of the individual wavelength channels are fed to the corresponding ONUs.

The length of the optical transmission route between one ONU and one RN typically equals up to a few kilometers or a few tens of kilometers. The length of the optical transmission route between the OLT and an RN likewise typically equals a few kilometers up to a few tens of kilometers.

As was already explained above, the linking of the RN to an OLT can be performed, in the case of a passive optical transmission network, both in the form of a star-shaped and a ring structure, wherein each of the transmission routes is formed as an optical transmission route. Because the transmission capacity in use in the optical transmission route between one RN and the OLT is many times higher than the transmission capacity in use in the transmission routes between an ONU and the relevant RN, it is technically and economically meaningful to realize a protection mechanism between the one or multiple RNs and the OLT, also in the case of passive optical transmission networks in which the optical transmission routes are relatively short in comparison with remote transmission routes.

The development of passive optical WDM networks with protection mechanisms is still in its beginning stages. The goal of corresponding developments must still be to realize the RN exclusively with passive optical elements or units, despite a realized line-protection mechanism, especially in order to minimize the maintenance expense.

Here, from the OECC proceedings, 2006, Bo-Zhang, Chun-Kit Chan, Chinlon Lin, propose a passive optical network in "A survivable WDM passive optical network with colorless optical network units," in which a protection mechanism is also realized. In the case of this passive optical network, each RN is connected to the OLT by means of an optical transmission route formed from four optical waveguides each with unidirectional operation. In the normal operating state, two of the optical waveguides are used for each one transmission direction. In the case of an interruption in one of these optical waveguides, in the OLT, it is switched over by means of an optical switch to a protection optical waveguide that is then used for transmitting a wavelength-multiplexed signal from the OLT to the RN. In this fault case, according to a special method, the wavelengths of the transmission channels in use are also switched over. Simultaneously, another protection optical waveguide is also used for the transmission from the RN to the OLT. Here, for realizing the special method for selecting working wavelengths and protection wavelengths or for switching over between these wavelengths, the periodicity of an AWG (Arrayed Waveguide Grating) is utilized.

The disadvantages of this passive optical transmission network are the expense for providing the protection wavelength channels and the expense for realizing the switching over between the working and protection wavelength channels.

Therefore, the invention is based on the problem of creating a passive optical transmission network with a protection mechanism that guarantees at least line protection of the transmission between the one or more RNs and the OLT and that can be realized in a simple way. In addition, the invention is based on the problem of creating a passive optical transmission network with a protection mechanism in which this method is realized.

The invention solves each of these problems with the features of Claims 1 and 8 and 13 and 18, respectively.

The invention starts from the knowledge that a protection mechanism for the transmission route between the OLT and an RN can be advantageously realized in that, in the RN, the wavelength-multiplexed signal to be transmitted to the OLT is fed both on a working path and also on a protection path. The RN is thus linked to the OLT by means of a second optical transmission route that similarly has a bidirectional structure and also provides a protection path for the wavelength-multiplexed signal to be transmitted from the OLT to the RN in addition to the protection path for the wavelength-multiplexed signal to be transmitted from the RN to the OLT. Each of the two bidirectional transmission routes can be realized either by means of a single optical path, for example, an optical waveguide used in bidirectional operation or by means of two separate optical paths, for example, two optical waveguides each used in unidirectional operation.

In the OLT there is a controllable optical switch unit that activates, in the normal operating state, the working transmission route for bidirectional transmission and, in the fault state, for example, in case of a disconnection of the working transmission route, switches over to the protection transmission route. In each of the two switch positions, the same wavelength-multiplexed signal to be transmitted from the OLT to the relevant RN is fed to the just active optical transmission route, i.e., either the working transmission route or the protection transmission route. Because, in the reverse transmission direction, the wavelength-multiplexed signal to be transmitted from the relevant RN to the OLT is fed simultaneously in the RN on both transmission routes, this can be received in the OLT in each of the two selectable switch positions.

The control of the switch unit provided in the OLT is performed as a function of the detection of a fault state that suggests a negative influence on the just active transmission route, particularly a negative effect on the working transmission route.

If both transmission routes, i.e., both the working transmission route and also the protection transmission route are designed in the form of two separate optical paths, then in the case of the detection of a fault state that suggests a negative influence on only one of the two just active optical paths, it is switched only to the path replacing this disrupted path. For example, if only the optical working path that is used in unidirectional operation for the transmission from the RN to the OLT is disrupted, then it can be switched over to the protection path that is used in unidirectional operation for transmission from the RN to the OLT. In this case, if the optical working path that is used for the transmission from the OLT to the RN is still intact, then this can be further used for the transmission without the switch units simultaneously having to replace this path by the relevant protection path for the transmission from the OLT to the RN.

For the determination of a fault state relevant for the switch-over, all of the known principles can be used. For example, in the OLT, the signal transmitted from the RN to the OLT can be detected. For this signal, if an impermissibly high signal attenuation or a signal reception level equal to zero is determined, then a fault state can be determined and a corresponding fault signal can be generated. The detection of the wavelength-multiplexed signal transmitted from the RN to the OLT is performed in the OLT preferably on both transmission routes or on all optical paths guiding a wavelength-multiplexed signal in the upstream direction.

In this context, it shall be noted that a transmission in the upstream direction is understood as the transmission of a signal from the RN to the OLT or from one ONU to the RN or to the OLT and a transmission in the downstream direction is understood as the transmission of a signal from the OLT to the RN or from the OLT or the RN to an ONU.

In principle, the detection of a fault state can also be performed in one or more network termination nodes (ONU), wherein, in this case, a detected fault state must be signaled from the ONU or the relevant ONUs to the OLT. This can take place, for example, by means of a corresponding transmission protocol. In the OLT, this fault information is evaluated and, if necessary, switched over to the other corresponding optical transmission path or to the other corresponding optical path (used in unidirectional operation). In this case, the switch-over can be performed preferably only when two or more or all of the ONUs signal a fault state. This is because, if, for example, a single ONU detects the loss of a receiver signal, then this could also be caused by the loss of the relevant transmitter unit in the OLT. The optical transmission route between the OLT and the RN could then still be intact, so that a switch-over is neither necessary nor useful.

According to one embodiment of the invention, for the wavelength channels of the wavelength-multiplexed signal in the downstream direction, a different wavelength band or different wavelength ranges are used than for the wavelength channels of the wavelength multiplexed signal in the upstream direction. This allows, in the OLT and the one or more RNs, the use of relatively simple and economical, passive, wavelength-dependent units for merging or separating signals that are guided in the upstream direction and in the downstream direction.

According to the invention, the fundamental protection principle could also be applied to the case of linking several RNs to the OLT by means of an optical transmission route in the form of a physical ring structure. In this case, the ring-shaped optical transmission route could be realized by a ring-shaped optical path used in bidirectional operation or by two ring-shaped optical paths that are each used in unidirectional operation.

In this case, the passive optical transmission network is structured so that, on each RN, one or more wavelength channels allocated to this RN are decoupled (drop channels) from the wavelength-multiplexed signal transmitted in the downstream direction and are added (add channels) to the wavelength-multiplexed signal transmitted in the upstream direction. The channels that are not dropped in an RN are fed through by means of correspondingly constructed passive optical components in the RN.

As already explained above for the linking of a single RN or the linking of several RNs with a star-shaped structure to an OLT, according to the invention, also for the ring-shaped linking of several RNs, in each RN the wavelength-multiplexed signal to be transmitted from the relevant RN to the OLT is fed to both sub-branches of the ring, i.e., the relevant wavelength-multiplexed signal is transmitted in the direction toward the OLT both at the east-side terminal of the RN and also at the west-side terminal of the RN. Because the wavelength-multiplexed signal that is transmitted from a certain RN to the OLT comprises only wavelength channels that are allocated exclusively to this RN, these wavelength channels and thus these partial multiplexed signals are fed through all of the other RNs of the transmission ring. In the OLT, in the case of a ring-shaped linking of several RNs, if a first signal-switch unit and a second signal-switch unit are provided, wherein these signal switch units are each connected to one end of the ring-shaped transmission route that can be made from a single optical path used in bidirectional operation or from two separate optical paths each used in bidirectional [sic; unidirectional] operation. In the first case, the signal-switch units have a single remote-side transmission and reception port and, in the second case, two remote-side ports, namely, a remote-side transmission port and a remote-side reception port.

On the local-side, the signal-switch units have a local-side transmission port and a local-side reception port for each RN. The wavelength-multiplexed signal containing those wavelength channels that are to be fed to the relevant RN is fed to the local-side transmission port. The signal-switch unit is designed so as to combine all of the (partial) wavelength-multiplexed signals fed to the local-side transmission port into a total wavelength-multiplexed signal and feed it, in the case of a single ring-shaped optical path, to the remote-side transmission port and reception port and, in the case of the linking of the RNs by means of two unidirectional optical paths, to the remote-side transmission port. The wavelength-multiplexed signal fed to the signal-switch unit from the RN is divided by the signal-switch unit into the individual (partial) wavelength-multiplexed signals generated by the RN, wherein each of these (partial) wavelength-multiplexed signals is fed to a local-side reception port. In the case of a single ring-shaped optical path used in bidirectional operation, the wavelength-multiplexed signal transmitted by the RN is fed to the one-side, remote-side transmission port and reception port, and is divided accordingly by the signal-switch unit. In the case of two separate unidirectional optical paths, the wavelength-multiplexed signal transmitted by the RN is fed to the remote-side reception port and divided accordingly.

The linking of the corresponding other end of the optical transmission route can be performed by means of a signal-switch unit with identical construction.

According to the invention, in the case of an annular linking of several RNs to the OLT, the detection of a fault state that suggests a negative effect on the east-side or west-side part of the ring-shaped optical transmission route between the OLT and the relevant RN is performed separately for each RN. In the case of the detection of a fault state of the just active east-side or west-side part of the ring-shaped transmission route, by means of each optical switch unit it can be switched over to the corresponding other part of the transmission route for each RN separately. In the case of the two ring-shaped optical paths, there is, in turn, the possibility to switch the downstream path separately from the upstream path. Thus, for each RN in the OLT, an optical switch unit is provided that has two change-over switches. The change-over ports of one change-over switch are connected to the local-side transmission port of the signal-switch units that are allocated to the corresponding RN. The switch ports of the other change-over switch are connected to the local-side reception ports of the signal-switch units that are allocated to the relevant RN. Each (partial) multiplexed signal to be transmitted to the relevant RN is fed to the common ports of the change-over switch in the downstream paths. Each of these (partial) multiplexed signals can be generated in the OLT by means of a corresponding number of transmitter units that each generate the signal for one wavelength channel, wherein these signals are each fed to a multiplexer unit whose multiplexer port is connected to the common port of the relevant change-over switch.

According to the invention, each RN can have an add/drop multiplexer unit that receives the (total) wavelength-multiplexed signal fed to it on the east side or west side and that decouples the (partial) wavelength-multiplexed signal designed for this RN. The other wavelength channels are fed through to the corresponding other side (west side or east side) of the add/drop multiplexer unit and are transmitted in the direction toward other RNs or the OLT. The (partial) wavelength-multiplexed signal to be transmitted from this RN to the OLT is fed to the add/drop multiplexer unit, according to the invention, both in the direction toward the east side and also in the direction toward the west side. The add/drop multiplexer unit adds this (partial) wavelength-multiplexed signal on both sides to the fed-through wavelength-multiplexed signal. Thus it is guaranteed that the OLT can select, through the selection of a corresponding switch position of the change-over switches of the switch units, wherein this position is allocated to the relevant RN, whether the (partial) wavelength-multiplexed signal transmitted from the relevant RN should be received via the east-side or west-side branch of the transmission ring.

Just like the signal-switch units of the OLT, the add/drop multiplexer unit can have a single east-side and a single west-side, remote-side transmission and reception port, when the linking is realized by means of a single ring-shaped optical path. If the linking is realized by means of two unidirectional, ring-shaped optical paths, then each add/drop multiplexer unit can have an east-side and a west-side reception port and an east-side and a west-side transmission port.

In addition, each add/drop multiplexer unit of an RN has an east-side and a west-side local reception port to which the corresponding received and dropped (partial) wavelength-multiplexed signal is connected as a function of the switch position in the OLT. The east-side and west-side local reception port can be connected according to the invention to a splitter unit that operates as a combiner unit and whose output is connected to a demultiplexer unit. The output ports of the demultiplexer unit then guide the signals of the wavelength channels that must be fed to the corresponding ONUs.

In the same way, an RN can feature a multiplexer unit to whose input ports the signals of the wavelength channels of the ONU are fed. The multiplexed output of the multiplexer unit is likewise connected to a splitter unit whose one output is connected to the east-side local transmission port and whose other output is connected to the west-side local transmission port of the add/drop multiplexer unit.

The linking of the ONU to an RN is preferably realized by means of a transmission route that is realized by a single optical path used in bidirectional operation. In this way, a correspondingly low wiring expense is realized.

The feeding of the signals of the wavelength channels received by the RN to an ONU and the reception and feeding of the signal received by the relevant ONU to the multiplexer unit of the RN can be realized by means of a signal-switch unit. This signal-switch unit has three ports, wherein a first port is connected to the optical path between the RN and the relevant ONU, a second port is connected to the output port of the demultiplexer unit of the RN allocated to this ONU, and a third port is connected to the input port of the multiplexer unit of the RN allocated to this ONU. The signal-switch unit here again forwards the signal of the ONU fed to it from the output port of the demultiplexer unit and the signal received by the ONU to the relevant port of the multiplexer unit.

The signal-switch unit can here be constructed as a circulator. In this case, it is possible to use the same wavelength channel in the downstream direction and in the upstream direction toward an ONU.

However, because a circulator is a relatively expensive component, the signal-switch units allocated to each ONU could also be constructed as passive, wavelength-dependent coupling units. In this case, however, it is then necessary to use different wavelength channels for the upstream and downstream directions.

Additional embodiments of the invention are given from the subordinate claims.

The invention will be explained in more detail below with reference to the embodiments shown in the drawings. Shown in the drawings are.

Figure 1:
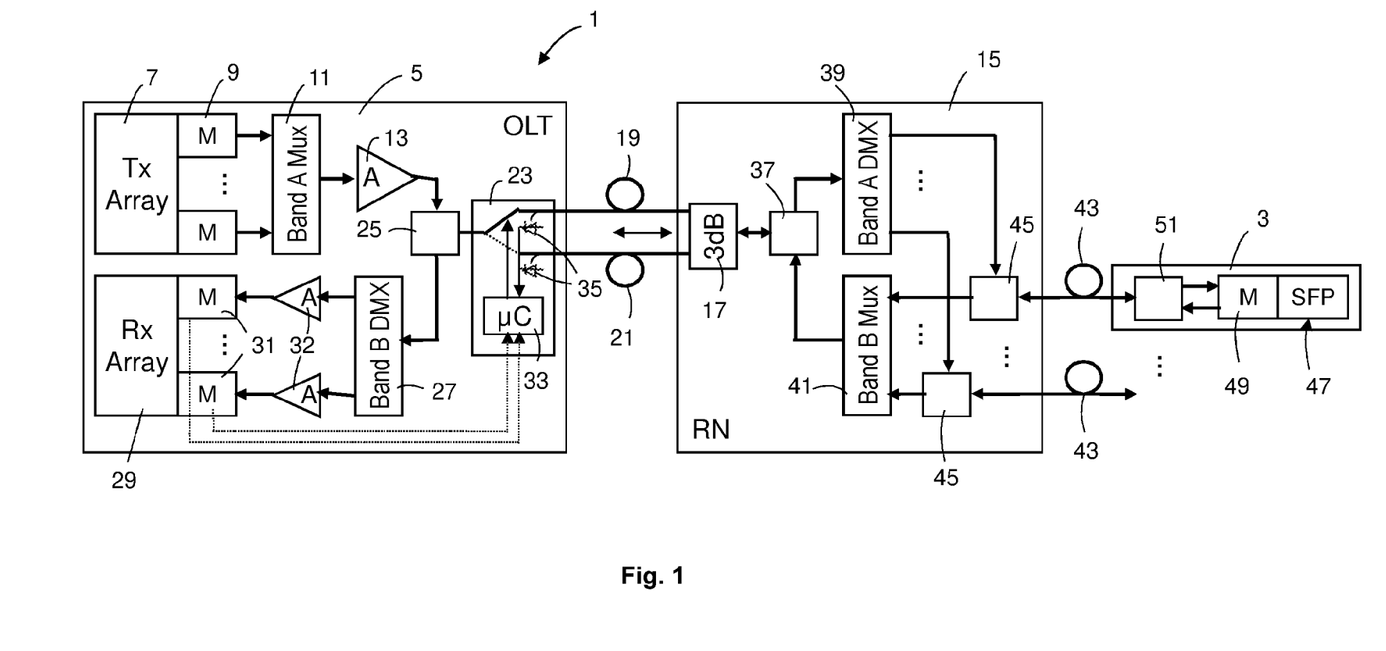
FIG. 1 a schematic block diagram of a passive optical transmission network with a protection mechanism, wherein two transmission routes are provided between the optical line terminal and a single remote node, wherein each transmission route comprises a single optical path, FIG. 2 an optical transmission network similar to that of FIG. 1, but with two transmission routes between the OLT and RN, with each of these routes comprising two separate unidirectional optical paths, FIG. 3 a schematic diagram of a passive optical transmission network with several RNs that are linked to the OLT by means of a ring-shaped transmission route, wherein the transmission route has a single bidirectional optical path, and FIG. 4 a passive optical transmission network similar to that of FIG. 3, wherein the ring-shaped transmission route comprises two separate unidirectional optical paths.

FIG. 1 shows a schematic block diagram of a passive optical transmission network 1 that is used to link a plurality of optical network termination nodes (ONU) 3 to an optical line terminal (OLT) 5, wherein bidirectional data transmission is enabled between each ONU 3 and the OLT. For each wavelength channel of an ONU 3, the OLT 5 comprises a transmitter unit generating an optical transmission signal that features a certain center wavelength. Each of these optical transmission signals occupies one wavelength channel that is allocated to the relevant ONU. The transmitter units of the OLT are shown in FIG. 1 in the form of an array 7 of transmitter units. A monitoring unit 9 can be allocated to each individual transmitter unit, wherein each of these monitoring units detects whether the corresponding transmitter unit has output a correct optical signal in the relevant wavelength channel. The optical transmission signals are fed to a multiplexer unit 11 that combines these transmission signals into a wavelength-multiplexed signal. The wavelength-multiplexed signal is fed to an optical amplifier unit 13 that is used to raise the wavelength-multiplexed signal to a desired signal level and to compensate for attenuation losses within the OLT 5.

In the embodiment shown in FIG. 1 of a passive optical transmission network, the single remote node (RN) 15 is linked by means of two optical transmission routes to the OLT. The two transmission routes are each realized in the shown embodiment by a single bidirectional optical path 19, 21, for example, an optical waveguide in the form of an optical fiber.

The RN 15 is designed so that, in the RN 15, all of the signals received from the ONU 3, each of a certain wavelength channel, are combined into one wavelength-multiplexed signal. This wavelength-multiplexed signal is simultaneously fed in RN 15 by means of a 3 dB splitter unit 17 on both optical paths 19 and 21 used in bidirectional operation. For this purpose, the optical paths 19, 21 are each connected to a splitting port of the splitter unit 17.

In the OLT, the two ends of the optical paths 19, 21 are each connected to one change-over port 23a, 23b, respectively, of an optical switch unit 23.

Due to the bidirectional use of the optical paths 19, 21, it is necessary, in the OLT, to provide a signal-switch unit 25 that has three ports. A first port is connected to the output of the optical amplifier 13, so that the wavelength-multiplexed signal to be transmitted from the OLT 5 to the RN 15 is fed to this port. A second port of the signal-switch unit 25 is connected to the common port of the change-over switch of the optical switch 23, wherein the wavelength-multiplexed signal transmitted from RN 15 to OLT 5 is fed to this port and wherein the signal-switch unit 25 also outputs, through this port, the wavelength-multiplexed signal fed to it from the first port and to be transmitted to the RN 15. The third port of the signal-switch unit 25 is connected to the input of a demultiplexer unit 27, wherein the signal-switch unit 25 outputs, through this port, the wavelength-multiplexed signal fed to it from the second port and received from RN 15.

The demultiplexer unit 27 demultiplexes the wavelength-multiplexed signal fed to it into the individual signals of the relevant wavelength channels and feeds each of these to a receiver unit for the relevant wavelength channel. In FIG. 1, the receiver units for the individual wavelength channels are shown as an array 29 of receiver units. Each receiver unit can comprise, in turn, a monitoring unit 31 with which it is detected whether the signal of the corresponding wavelength channel is fed with sufficient reception level to the relevant receiver unit. An optical amplifier unit 32 can be provided between each output port of the demultiplexer unit 27 and the input port of each receiver unit, wherein the arrangement of amplifier units in the path of each wavelength channels offers the advantage that the signal of each wavelength channel can be raised individually to a desired reception level.

The monitoring units 31 can each be connected to a control device in the form of a control unit 33 for the optical switch unit 23. The monitoring units 31 can also evaluate, in addition to or instead of the monitoring of the reception level of the reception signals, fault-state information contained in the reception signals. Such fault-state information that is transported in the reception signals can be generated by the ONU 3, for example, when the relevant ONU 3 determines that its reception signal no longer has the desired reception level or has been completely dropped, i.e., the reception level has fallen to zero. Both this fault-state information and also fault-state information generated by the monitoring units 31 in the case of the monitoring of the reception level can be transmitted to the control unit 33. The control unit 33 can then evaluate all of the fault-state information and can control, as a function of this evaluation, the optical switch unit 23 so that it is switched over from the working transmission route active during normal operation or from the bidirectional optical working path 19 realizing this transmission route to the protection transmission route or the bidirectional optical protection path 21 realizing this protection transmission route.

Instead of the fault-state information that is transmitted from the monitoring units 31 to the control unit 33 or in addition to this fault-state information, the signals of two detectors 35 each of which detect the wavelength-multiplexed signal received in the OLT, can also be fed to the control unit 33. For this purpose, the wavelength-multiplexed signal fed to each of the change-over ports 23a, 23b can be detected by the relevant detector 35. For example, for this purpose, an optical coupler could be used that decouples a small fraction of the optical power of the signal from the optical path for the corresponding received wavelength-multiplexed signal and feeds it to the detector 35. The control unit 33 can then determine whether the corresponding received wavelength-multiplexed signal exists with a sufficient reception level. If this is not the case or if, in particular, the reception level has fallen completely to zero, then the control unit 33 can conclude there is a fault in the corresponding optical path 19 or 21 and can switch over to a corresponding intact path.

As shown in FIG. 1, the control unit 33 can be integrated into the optical switch unit 23. The same applies for the detectors 35. However, each of these units obviously could also be either constructed separately and/or also integrated into a different unit.

In the RN 15, the local-side port of the splitter unit 17 is connected via a signal-switch unit 37 both to the input port of a demultiplexer unit 39 and also to the output port of a multiplexer unit 41. The signal-switch unit 37 here fulfills a function analogous to the signal-switch unit 25 in the OLT 5. The wavelength-multiplexed signal received in the RN 15 is fed from the signal-switch unit 37 to the input of the demultiplexer unit 39 that demultiplexes the wavelength-multiplexed signal into the signals of the individual wavelength channels. In addition, the signal-switch unit 37 feeds to the splitter unit 17 the wavelength-multiplexed signal that is fed to it by the multiplexer unit and that comprises the signals of the wavelength channels of all of the ONUs 3.

The two signal-switch units 25 or 37 could be designed as circulators, wherein, in this case, the advantage is given that, for the wavelength channels transmitted in both directions between the OLT and the RN, identical center frequencies could also be used. In particular, corresponding wavelength channels with identical center frequencies could be used both in the downstream direction between the OLT and an ONU and in the relevant upstream direction.

In all of the embodiments shown in FIGS. 1-4, the ONUs 3 are linked to the RN 15 by means of a transmission route that is made from a single bidirectional optical path 43. In this way, a correspondingly low wiring expense is achieved.

Through the bidirectional linking of the ONU 3 to the RN 15, it is necessary to provide, for each ONU in the RN 15, another signal-switch unit 45. Each signal-switch unit 45 is fed, from the demultiplexer unit 39, the signal of the relevant wavelength channel that is forwarded from the signal-switch unit 45 to the ONU 3 to which this wavelength channel is allocated. In the same way, for transmission in the upstream direction, the signal-switch unit 45 feeds the signal of the specified wavelength channel fed to it from the corresponding ONU 3 to the allocated input port of the multiplexer unit 41.

These signal-switch units 45 could also be designed as passive optical circulators.

However, if a different wavelength band or different wavelength ranges are used for each of the wavelength channels transmitted in the upstream direction and in the downstream direction, the signal-switch units 25, 37, and 45 could all also be realized as passive wavelength-dependent coupling units.

Each ONU 3 comprises a transceiver unit 47 for receiving the signal of the relevant reception wavelength channel and for generating the signal of the relevant transmission wavelength channel. The transceiver unit 47 here can have a monitoring unit 49 that detects whether the reception signal still has the desired reception level. As a function of this, the transceiver unit 47 can integrate fault-state information into the transmission signal that can then be evaluated in the OLT in the monitoring unit 31 of the allocated reception unit.

Due to the bidirectional transmission on a single optical path between the ONU 3 and the RN 15, each ONU 3 also comprises a signal-switch unit 51 for separating the signals in the upstream direction and in the downstream direction. This signal-switch unit 51 also operates analogously to the signal-switch units 25, 37, and 45 and can be designed accordingly. A signal fed to the signal-switch unit 51 from the optical path 43 is fed to the receiver part of the transceiver unit 47 and the transmission signal fed to the signal-switch unit 51 from the transmitter part of the transceiver unit 47 is fed to the optical path 43.

Figure 2:
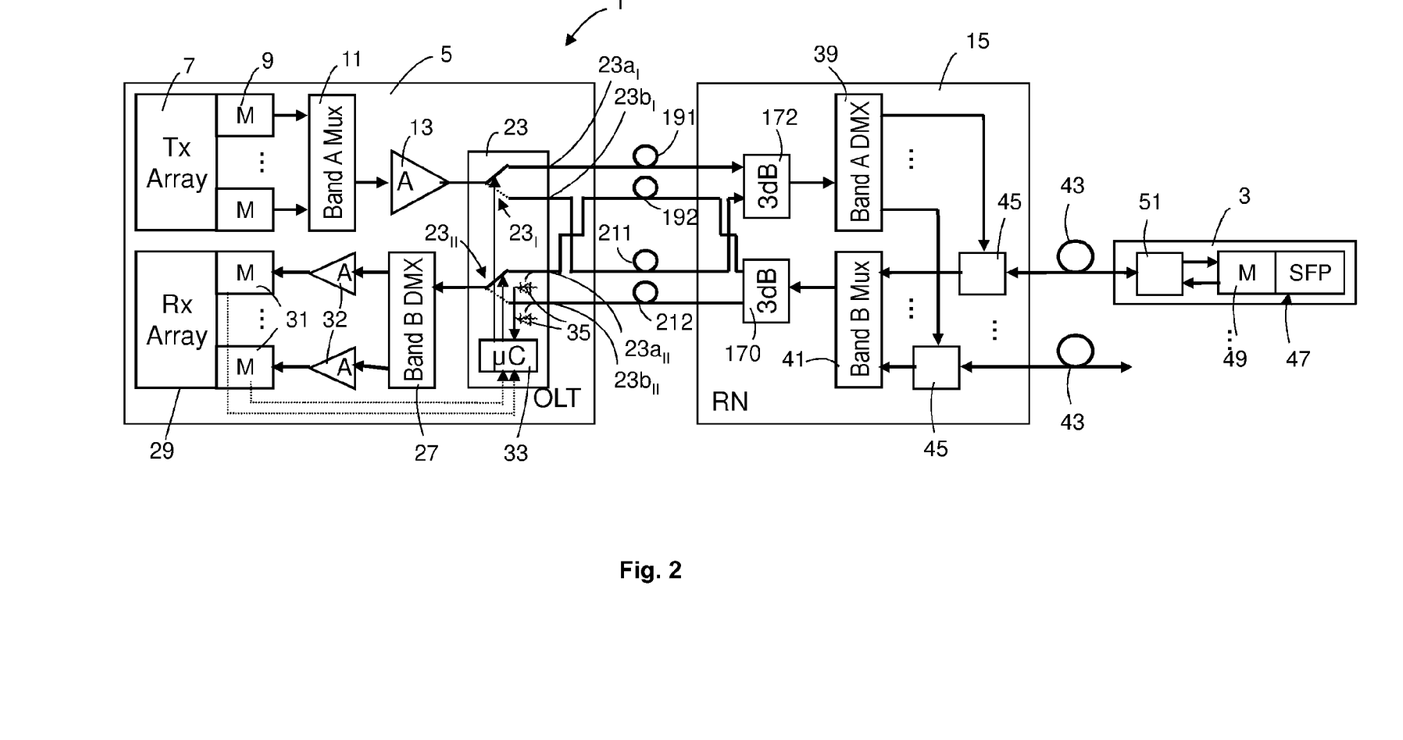

The embodiment shown in FIG. 2 for a passive optical transmission network 1 differs from the embodiment shown in FIG. 1 merely in that the two optical transmission routes are each realized for connecting the RN 15 and to OLT 5 through two separate optical paths 191, 192 or 211, 212 used in unidirectional operation.

Due to the paths 191, 192 and 211, 212 each used in unidirectional operation, the signal-switch units 25 and 37 shown in FIG. 1 can be eliminated. In their place, two separate splitter units 170, 172 are required in the RN 15 instead of the single 3 dB splitter unit 17. The 3 dB splitter unit 170 here splits the wavelength-multiplexed signal fed to it from the multiplexer unit 41 and feeds it in equal parts to each of the optical working path 192 and the optical protection path 212.

The second optical splitter unit 172 is connected with one of the splitting ports to the working path 191 in the downstream direction and with the other splitting port to the protection path 211 in the downstream direction. The splitter unit 172 here operates as a combiner unit and feeds the signal to the demultiplexer unit 39 at its output port.

By realizing the working transmission route and the protection transmission route each through two separate unidirectional optical paths 191, 192 and 211, 212, the switch unit 23 in OLT 5 must have, in this case, two change-over switches $23_I$ and $23_{II}$. The change-over ports $23a_I$ and $23b_I$ are connected to the end of the working path for the upstream direction and to the protection path 211 for the upstream direction, respectively. The common port of the change-over switch $23_I$ is connected to the output of the optical amplifier 13.

In the same way, the change-over ports $23a_{II}$ and $23b_{II}$ are connected to the working path 192 for the upstream direction and to the protection path 212 for the upstream direction. The common port of the change-over switch $23_{II}$ is connected to the input port of the demultiplexer unit 27.

In the case of the embodiment shown in FIG. 2, the detectors 35 are provided in the optical paths that are provided with the change-over ports 23 $a_{II}$ and 23 $b_{II}$ of the change-over switch $23_{II}$. This is because the wavelength-multiplexed signal received by the OLT 5 appears only in these paths.

The configuration shown in FIG. 2 theoretically allows it to switch over to only one of the protection paths 192, 212 when only the associated working path 191 for the downstream direction or only the associated working path 192 for the upstream direction is disturbed or disconnected. For suitable controlling of the change-over switches $23_I$ and $23_{II}$, the control unit 33 can evaluate, also as in the case of the embodiment according to FIG. 1, the fault-state information supplied by the detectors 35 or the monitoring unit 31.

Figure 3:
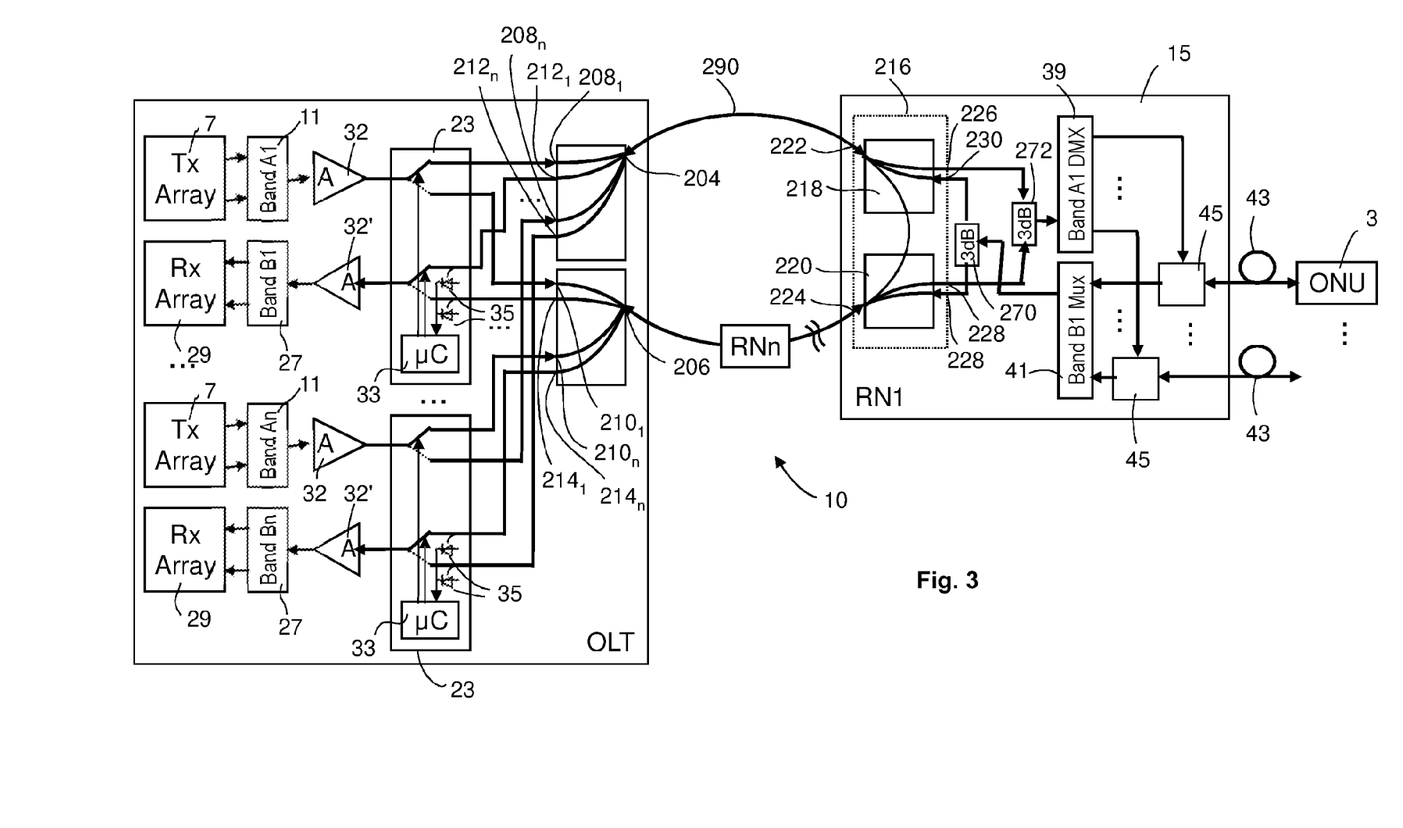

FIG. 3 shows an embodiment of a passive optical transmission network 10 in which a plurality of ONUs 3 are linked to an OLT 5 by means of several RNs 15 that are also designated RN 1 to RNn. The linking of the RNs 15 is performed here by means of a ring-shaped transmission route that is realized, in the case of the embodiment shown in FIG. 3, by a single ring-shaped optical path 290 used in bidirectional operation, for example, in an optical waveguide.

As shown in FIG. 3, the linking of the bidirectional ring-shaped optical path 290 to the OLT 5 takes place by means of signal-switch units 200 provided in the OLT (west-side linking of the OLT) and 202 (east-side linking of the OLT), each of which has a remote-side transmission port and reception port 204 and 206, respectively. In addition, the signal-switch units 200 and 202 have, for each of the n RNs (RN1 to RNn), a local transmission port $208_1$ to $208_n$ and $210_1$ to $210_n$, respectively, as well as a local reception port $212_1$ to $212_n$ and $214_1$ to $214_n$, respectively.

The relevant partial multiplexed signal generated in the OLT is fed to each of the signal-switch units 200 and 202, respectively, at the local transmission ports $208_1$ to $208_n$ and $210_1$ to $210_n$, respectively, wherein this signal comprises all of the wavelength channels that are allocated to the relevant RN 15 (RN 1 to RNn). The signal-switch units 200 and 202, which are constructed as passive optical components, each combine these partial wavelength-multiplexed signals into a total wavelength-multiplexed signal that is output to the remote-side transmission and reception ports 204, 206. From which transmission and reception port 204 or 206 the relevant partial multiplexed signal is output in the direction toward the allocated RN 15 is determined by the switch position of the two change-over switches of a switch unit 23 that is allocated to the relevant RN 15. This switch unit 23 in the OLT 5 features the same functionality as the switch unit 23 in the case of the embodiment described in FIG. 2. In the case of the embodiment according to FIG. 3, however, for each of the RNs 15, a corresponding switch unit 23 is provided, wherein, in the OLT 5 according to FIG. 3, merely the switch units 23 for the first RN 15 (RN 1) and the n-th 15 (RNn) are shown.

The change-over ports of the first change-over switch of the switch units 23 to whose common switch ports the corresponding partial wavelength multiplexed signals to be transmitted are fed are connected to the local transmission ports $208_1$ and $210_1$ to $208n$ and $210n$ of the signal-switch units 200 and 202, respectively. Thus, depending on the switch position of the change-over switch of the switch units 23, the partial wavelength-multiplexed signal to be transmitted to the relevant node is fed to the west-side transmission and reception port 204 of the signal-switch unit 200 or to the east-side transmission and reception port 206 of the signal-switch unit 202. In the case of the switch position shown in FIG. 3, the relevant partial wavelength-multiplexed signal is fed to the first RN 15 (RN1) shown in detail via the west-side transmission and reception port 204 of the signal-switch unit 200. In the case of the switch position shown in FIG. 3 for the associated switch unit 23, the relevant partial wavelength-multiplexed signal is fed to the n-th RN 15 (RNn) via the east-side transmission and reception port 206 of the signal-switch unit 202.

The channel signals designed for a specified RN 15 are generated by a number of corresponding transmission units, wherein, in FIG. 3, the transmission units allocated to RN 15 are combined into an array 7 of transmission units. Obviously, these transmission units could also comprise monitoring units, as shown in FIGS. 1 and 2 and explained in this context, with which the transmitted optical signal can be detected and monitored.

The change-over ports of the second change-over switch of each switch unit 23 are each connected to the two local reception ports $212_1$ to $212_n$ or $214_1$ to $214_n$ that are allocated to the corresponding RN 15. Because, as previously explained, the partial wavelength multiplexed signal to be transmitted from each RN 15 to the OLT is transmitted both on the east-side and on the west-side sub-paths of the ring-shaped optical path 290 in the direction towards the OLT 5, the second change-over switch of the switch units 23 can be used to select which of these received partial wavelength multiplexed signals should be used. In the case of a fault in the east-side or west-side part of the ring-shaped transmission route or the ring-shaped optical path 290, it can then be switched over to the corresponding, undisturbed sub-path. The received partial wavelength multiplexed signal is demultiplexed by means of a demultiplexer unit 27, so that the individual signals of the relevant wavelength channels allocated to the corresponding nodes can be fed to corresponding reception units. The reception units are shown in FIG. 3, in turn, as arrays 29 of reception units, wherein a corresponding array of reception units 29 is allocated to each RN 15.

In the embodiment of FIG. 3, unlike those of FIGS. 1 and 2, an amplification of the corresponding partial wavelength-multiplexed signal is provided by means of an optical amplifier 32'. Obviously, however, in this case the signal of each individual wavelength channel could also be raised to the desired reception level by means of a separate optical amplifier that is arranged in the path between the demultiplexer unit and the associated reception unit.

In the case of the embodiment according to FIG. 3, in the transmission paths allocated to each RN 15 in the OLT, an amplification of each partial wavelength-multiplexed signal is also performed before being fed to the common port of the first change-over switch of the switch units 23.

The embodiment according to FIG. 3 thus allows it to change over to the corresponding other sub-path separately for each RN 15 in the case of a fault or a disconnection of the east-side or the west-side sub-path of the ring-shaped optical path 290. If one of these sub-paths is still intact, then the bidirectional transmission between the OLT 5 and the corresponding RN 15 or the ONUs 3 allocated to this RN 15 can be maintained. The control of the switch units 23 allocated to each RN 15 is performed in the case of the embodiment shown in FIG. 3 by separate control units 33 similarly allocated to the relevant RN 15. The same information and signals concerning fault-state information can be fed to these control units 33 as in the case of the embodiments shown in FIGS. 1 and 2. For reasons of simplicity, however, in FIG. 3 only the detectors 35 are drawn. Obviously, the control units 33 could also be combined into one control unit and provided at an arbitrary position in the OLT.

In the case of the embodiment shown in FIG. 3 for a passive optical transmission network, the RNs 15 for linking or integrating into the ring-shaped optical path 290 have a passive add/drop multiplexer unit 216 that is made from two signal-switch units 218, 220. Each of the signal-switch units 218, 220 has a remote-side transmission and reception port 222, 224. The transmission and reception port 222 is connected to the east-side sub-path and the transmission and reception port 224 is connected to the west-side sub-path (each from the viewpoint of the RN) of the ring-shaped optical path 290.

In addition, each of the signal-switch units 218, 220 has a local reception port 226, 228 as well as a local transmission port 230, 232.

The remote-side and local ports of the signal-switch units 218, 220 simultaneously define corresponding ports of the add/drop multiplexer unit 216.

The signal-switch units 218, 220 decouple, from the wavelength-multiplexed signal received on the transmission and reception port 222, 224, the partial wavelength multiplexed signal specified for the relevant RN 15 and feed it to the local reception port 226 or 228. The signal-switch units 218, 220 feed the partial wavelength-multiplexed signal fed to the local transmission ports 230 or 232 and generated in the corresponding RN 15 to the transmission and reception port 222 or 224 and multiply the relevant partial wavelength-multiplexed signal by the corresponding passed-through signal. For passing through the remaining part of the wavelength-multiplexed signal, the signal-switch units 218, 220 are connected so that, with reference to the passed-through (remaining) wavelength-multiplexed signal, the closed, ring-shaped optical path 290 is given. The ring-shaped optical path 290 thus consists of the optical waveguides as well as the parts of the optical path between the remote-side transmission and reception ports 222 and 224 of the RN 15.

At this point it should be noted that the (closed) ring-shaped path is understood to mean a ring-shaped, closed optical transmission route between the remote-side transmission and reception ports 204, 206 of the signal-switch units 200, 202 of the OLT 5.

The further construction of the RN 15 in FIG. 3 largely corresponds to the construction of the RN 15 according to FIG. 2. In turn, two 3 dB splitter units 270, 272 are provided, wherein the splitter unit 270 is used to feed the partial wavelength-multiplexed signal fed to it simultaneously to the local transmission ports 230, 232 of the add/drop multiplexer unit 216. The splitter unit 272 operating as a combiner unit is connected to the two local reception ports 226, 228 of the add/drop multiplexer unit 216 and feeds the partial wavelength-multiplexed signal received on one or the other branch to the demultiplexer unit 39. With respect to the other components of the RN 15 according to FIG. 3 and the linking of the ONUs 3 to the RN 15, reference is made to the description of the RNs according to FIGS. 1 and 2.

Figure 4:
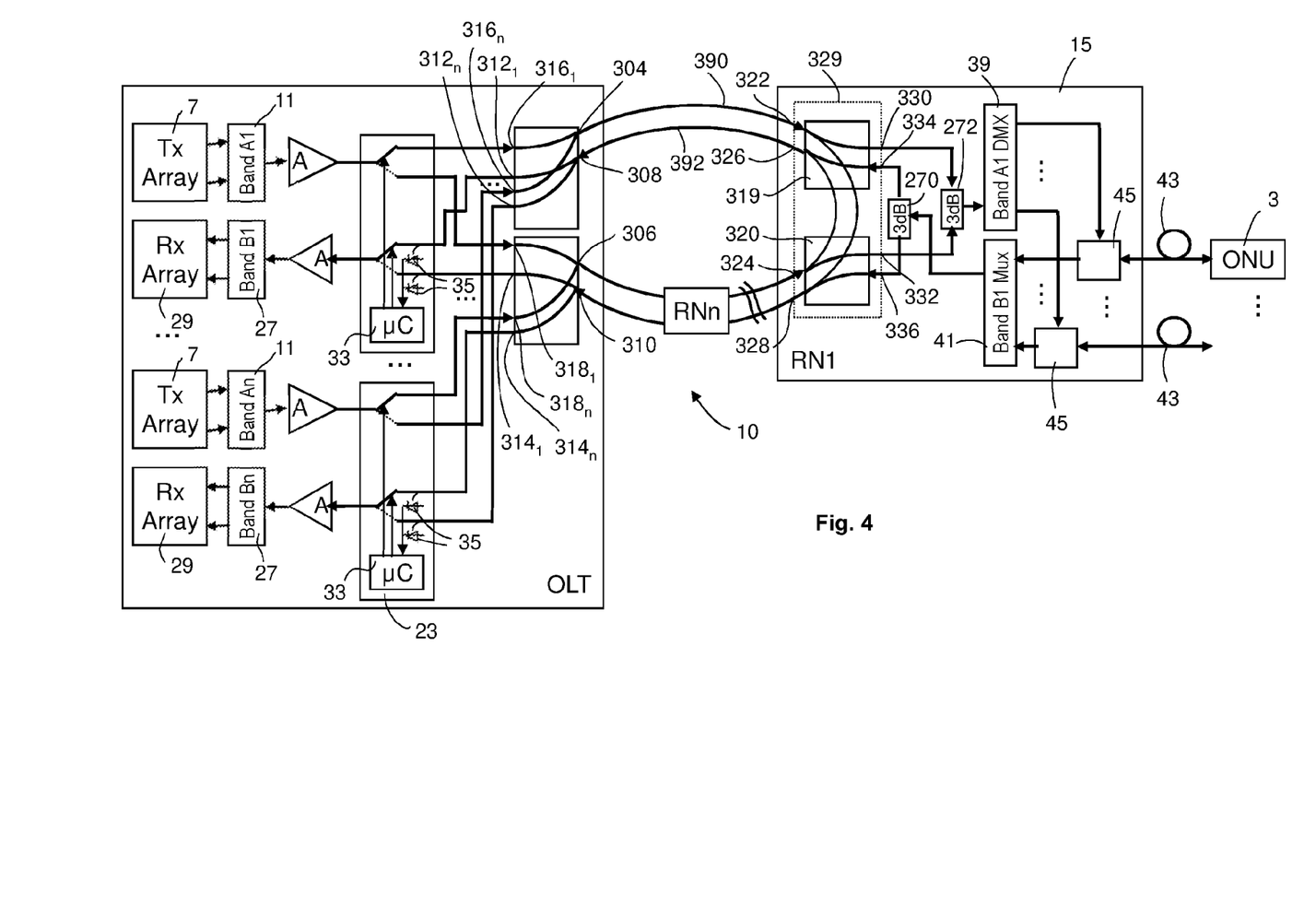

The embodiment shown in FIG. 4 for a passive optical transmission network 100 differs from the embodiment according to FIG. 3 merely in that the ring-shaped optical transmission route has two optical paths 390, 392 used in unidirectional operation instead of a single optical path used in bidirectional operation. Thus, merely slight changes are given with respect to the signal-switch units in the OLT 5 and with respect to the add/drop multiplexer unit or the signal-switch units realizing this unit in the RN 15.

As is clear from FIG. 4, in the case of this embodiment, the signal-switch units 300, 302 each have separate remote-side transmission ports 304, 306 and reception ports 308, 310. The wavelength-multiplexed signals received on the remote-side reception ports 308, 310 are divided into the individual partial multiplexed signals and fed, as in the case of the embodiment in FIG. 3, to corresponding local reception ports $312_1$ to $312_n$ or $314_1$ to $314_n$. In the same way, the partial wavelength-multiplexed signals fed to the local transmission ports $316_1$ to $316_n$ or $318_1$ to $318_n$ are fed to the corresponding remote-side transmission port 304 or 306. Incidentally, the configuration and functioning of the OLT 5 according to FIG. 4 are identical to the configuration and functioning of the OLT 5 according to FIG. 3.

The add/drop multiplexer unit 329 of the RN 15 in FIG. 4 also has separate, remote-side reception ports 322 or 324 and transmission ports 326 or 328. In addition, the signal-switch units 318, 320 are designed so that undropped partial wavelength-multiplexed signals are passed through as a remaining wavelength-multiplexed signal. For this purpose, the signal-switch units 318, 320 are connected by means of corresponding optical paths. In this way, two separate ring-shaped optical paths 390, 392 used in unidirectional operation are given for linking the RN 15 to the OLT 5.

Due to the separate remote-side reception parts 322, 324 and transmission ports 326, 328, the signal-switch units 318, 320 are designed so that, at the local reception ports 330, 332, the dropped partial wavelength-multiplexed signals are output and that the partial wavelength-multiplexed signal fed to each of the local transmission ports 334, 336 can be fed to the remote-side transmission ports 326, 328. Incidentally, the configuration and functioning of the RN 15 according to FIG. 4 are also identical to the configuration and functioning of the RN 15 according to FIG. 3.

The invention claimed is:

1. Method for protecting a passive optical transmission network comprising an optical line terminal (5) that is connected to at least one remote node (15) to which a plurality of network termination nodes (3) are linked,
  (a) wherein bidirectional optical signal transmission can be established between each network termination node (3) and the optical line terminal (5), and
  (b) wherein the connection between the optical line terminal (5) and the one or more remote nodes (15) is realized by means of a first bidirectional optical transmission route by which means an optical wavelength-multiplexed signal is transmitted in the downstream direction from the optical line terminal (5) to the one or more remote nodes (15) and in the upstream direction from the one or more remote nodes (15) to the optical line terminal (5), characterized in that
  (c) a second bidirectional optical transmission route is provided between the optical line terminal (5) and the one or more remote nodes (15),
  (d) in the one or more remote nodes (15), the wavelength-multiplexed signal is fed in the upstream direction by means of a passive optical splitter unit (17, 170) both to the first optical transmission route and to the second optical transmission route,
  (e) in the optical line terminal (5), in the case of the detection of a fault state that suggests a negative influence on the first or second optical transmission route, it is switched over to the other corresponding optical transmission route by means of an optical switch unit (23) for transmitting the wavelength-multiplexed signal in the downstream direction and/or for receiving the wavelength-multiplexed signal in the upstream direction, and
  (f) in the at least one remote node (15), the wavelength-multiplexed signal which is fed to the at least one remote node in the downstream direction either through the first or the second transmission route is output by means of the passive optical splitter unit (17) at an output port of the passive optical splitter unit or by means of an additional passive optical splitter unit (172) at an output of the additional passive optical splitter unit for a subsequent demultiplexing process.

2. Method according to claim 1, characterized in that the fault state is a parameter exceeding a maximum permissible value for the signal attenuation or falling below a minimum required signal-reception level, in particular, a signal-reception level equal to zero.

3. Method for protecting a passive optical transmission network comprising an optical line terminal (5) that is connected in the form of a physical ring structure to several remote nodes (15) to each of which a plurality of network termination nodes (3) are linked,
  (a) wherein bidirectional optical signal transmission can be established between each network termination node and the optical line terminal (5), and
  (b) wherein the connection between the optical line terminal (OLT) and each of the remote nodes (15) is realized by means of an east-side or west-side part of a ring-shaped bidirectional optical transmission route forming the physical ring structure by means of which an optical wavelength-multiplexed signal is transmitted in the downstream direction from the optical line terminal (5)

to the remote nodes (15) and in the upstream direction from the remote nodes (15) to the optical line terminal (5), (c) wherein, at each remote node (15), one or more wavelength channels allocated to the respective remote node (15) are decoupled from the wavelength-multiplexed signal transmitted in the downstream direction and added to the wavelength-multiplexed signal transmitted in the upstream direction, characterized in that (d) in the remote nodes (15), the wavelength-multiplexed signal is fed in the upstream direction by means of a passive optical splitter unit (270) both to the relevant east-side part of the ring-shaped optical transmission route and also to the west-side part of the ring-shaped optical transmission route (e) in the optical line terminal (5), separately for each remote node (15), in the case of the detection of a fault state that suggests a negative influence on the east-side or west-side part of the ring-shaped optical transmission route between the optical line terminal (5) and the relevant remote node (15), it can be switched over by means of a corresponding optical switch unit (23) for transmitting the wavelength-multiplexed signal in the downstream direction and/or for receiving the wavelength-multiplexed signal in the upstream direction to the other corresponding west-side or east-side part of the ring-shaped optical transmission route, and (f) in each remote node (15) the wavelength-multiplexed signal which is fed to the respective remote node in the downstream direction either through the west-side or east-side part of the ring-shaped optical transmission route is output by means of an additional passive optical splitter unit (272) at an output of the additional passive optical splitter unit for a subsequent demultiplexing process.

4. Method according to claim 3, characterized in that the wavelength-multiplexed signal guided in the east-side and west-side part of the optical transmission route in the upstream direction is split in the optical line terminal (5) into several wavelength-multiplexed group signals, wherein each wavelength-multiplexed group signal comprises the wavelength channels allocated to a specified remote node (15), wherein each wavelength-multiplexed group signal transmitted on an undisturbed east-side or west-side part of the ring-shaped optical transmission route is fed to a receiver unit by means of the relevant optical switch unit (23).

5. Method according to claim 4, characterized in that the fault state in the optical line terminal (5) is detected, wherein the fault state is a parameter exceeding a maximum permissible value for the signal attenuation or falling below a minimum required signal reception level for at least one wavelength-multiplexed group signal, in particular, a reception level equal to zero.

6. Passive optical transmission network comprising an optical line terminal (5) that is connected to at least one remote node (15) to which a plurality of network termination nodes (3) are linked, (a) wherein bidirectional optical signal transmission can be established between each network termination node (3) and the optical line terminal (5), and (b) wherein the connection between the optical line terminal (5) and the one or more remote nodes (15) is realized by means of a first bidirectional optical transmission route by means of which an optical wavelength-multiplexed signal is transmitted in the downstream direction from the optical line terminal (5) to the one or more remote nodes (15) and in the upstream direction from the one or more remote nodes (RN1 to RNn) to the optical line terminal (5), characterized in that (c) a second bidirectional optical transmission route is provided between the optical line terminal (5) and the one or more remote nodes (15), (d) in the one or more remote nodes (15), the wavelength-multiplexed signal is fed in the upstream direction by means of a passive optical splitter unit (17, 170) both to the first optical transmission route and also to the second optical transmission route, (e) in the optical line terminal (5) there is a control unit (33) that controls a controllable optical switch unit (23), in the case of the detection of a fault state that suggests a negative influence on the first or the second optical transmission route, so that it is switched over to the other corresponding optical transmission route for transmitting the wavelength-multiplexed signal in the downstream direction and/or for receiving the wavelength-multiplexed signal in the upstream direction, and (f) in one or more remote nodes (15) the wavelength-multiplexed signal which is fed to the respective remote node in the downstream direction either through the first or the second optical transmission route is output by means of the passive optical splitter unit (17) at an output port of the passive optical splitter unit or by means of an additional passive optical splitter unit (172) at an output of the additional passive optical splitter unit for a subsequent demultiplexing process.

7. Passive optical transmission network according to claim 6, characterized in that the first and second optical transmission routes each have a single optical path (19, 21) for the transmission of the wavelength-multiplexed signals from the optical line terminal (5) to the one or more remote nodes (15) and vice versa, wherein, in the optical line terminal (5), a switch-over port of the optical switch unit (23) is connected to one of the optical paths (19, 21) and wherein the associated common switch port is connected to a port of a signal-switch unit (25) that feeds the wavelength-multiplexed signal that is fed to it and that is to be transmitted to the one or more remote nodes (15) to the common switch port and wherein this signal-switch unit feeds the wavelength-multiplexed signal transmitted to the optical line terminal (OLT) to a demultiplexer unit (27).

8. Passive optical transmission network according to claim 6, characterized in that the first and second optical transmission routes each comprise two unidirectional optical paths (191, 192; 211, 212), each with opposite transmission directions, wherein, in the optical line terminal (5), each of the switch ports ($23a_I$, $23b_I$, $23a_I$, $23b_I$) of each change-over switch ($23_I$, $23_{II}$) of the optical switch unit (23) is connected to the two optical paths (191, 211; 192, 212) for the same transmission direction, wherein the common port of the switch ($23_{II}$) for the wavelength-multiplexed signal received from the optical line terminal (5) is connected to a demultiplexer unit (27) and the common port of the switch ($23_I$) for the wavelength-multiplexed signal to be transmitted from the optical line terminal (5) is connected to a multiplexer unit (11), and wherein an optical amplifier unit (13) is provided in the connection between the common port of the switch ($23_I$) for the wavelength-multiplexed signal to be transmitted from the optical line terminal (5) to the multiplexer unit (11).

9. Passive optical transmission network according to claim 8, characterized in that, in the remote node (15), each of the two splitting ports of each splitter unit (170; 172) is connected to the two optical paths (191, 211; 192, 212) for the same transmission direction and wherein the common port of the splitter unit (172) to which the wavelength-multiplexed signal to be transmitted to the remote node is fed is connected to a demultiplexer unit (39) and the common port of the splitter unit (170) to which the wavelength-multiplexed signal to be transmitted to the optical line terminal (5) is connected to a multiplexer unit (41).

10. Passive optical transmission network comprising an optical line terminal (5) that is connected in the form of a physical ring structure to several remote nodes (15) to each of which a plurality of network termination nodes (3) are linked,
   (a) wherein bidirectional optical signal transmission can be established between each network termination node (3) and the optical line terminal (5), and
   (b) wherein the connection between the optical line terminal (5) and each of the remote nodes (15) is realized by means of an east-side or west-side part of a ring-shaped, bidirectional optical transmission route that forms the physical ring structure and by which means an optical wavelength-multiplexed signal is transmitted in the downstream direction from the optical line terminal (5) to the remote nodes (15) and in the upstream direction from the remote nodes (15) to the optical line terminal (5),
   (c) wherein, at each remote node (15), one or more wavelength channels allocated to the respective remote node (RN1 to RNn) are decoupled from the wavelength-multiplexed signal transmitted in the downstream direction and added to the wavelength-multiplexed signal transmitted in the upstream direction by means of a passive optical add/drop multiplexer unit (216, 329),
characterized in that
   (d) in the remote nodes (15), the wavelength-multiplexed signal is fed in the upstream direction by means of a passive optical splitter unit (270) both to the relevant east-side part of the ring-shaped optical transmission route and to the west-side part of the ring-shaped optical transmission route,
   (e) in the optical line terminal (5) there is a separate control device for each remote node (15), wherein the respective control device controls, in the case of the detection of a fault state that suggests a negative influence on the east-side or west-side part of the ring-shaped optical transmission route between the optical line terminal (5) and the relevant remote node (15), an optical switch unit (23) so that it is switched over to the other corresponding west-side or east-side part of the ring-shaped, optical transmission route for transmitting the wavelength-multiplexed signal in the downstream direction and/or for receiving the wavelength-multiplexed signal in the upstream direction, and
   (f) in each remote node (15) the wavelength-multiplexed signal which is fed to the respective remote node in the downstream direction either through the west-side or east-side part of the ring-shaped optical transmission route is output by means of an additional passive optical splitter unit (272) at an output of the additional passive optical splitter unit for a subsequent demultiplexing process.

11. Passive optical transmission network according to claim 10, characterized in that in the optical line terminal (5) there are first (200, 300) and second (202, 302) signal-switch units that are each connected to one end of the ring-shaped transmission route.

12. Passive optical transmission network according to claim 11, characterized in that, in the optical line terminal (5) for each remote node (15) there is an optical switch unit (23), wherein each switch unit (23) has two change-over switches, wherein the wavelength-multiplexed signal to be transmitted from the optical line terminal (5) to the relevant remote node (15) is fed to the common port of the first change-over switch and the wavelength-multiplexed signal transmitted from the relevant remote node (15) to the optical line terminal (5) is fed to the common port of the second change-over switch, and wherein the two change-over ports of the first change-over switch are connected to the relevant local transmission port ($208_1$ to $208_n$; $210_1$ to $210_n$; $316_1$ to $316_n$; $318_1$ to $318_n$) of the first (200, 300) and the second (202, 302) signal-switch unit and the two switch-over ports of the second change-over switch are connected to the relevant port ($212_1$ to $212_n$; $214_1$ to $214_n$; $312_1$ to $312_n$; $314_1$ to $314_n$) of the first (200, 300) and the second (202, 302) signal-switch unit.

* * * * *